D. A. McCONNELL.
CULTIVATOR ATTACHMENT.
APPLICATION FILED SEPT. 16, 1914.
1,214,337.
Patented Jan. 30, 1917.
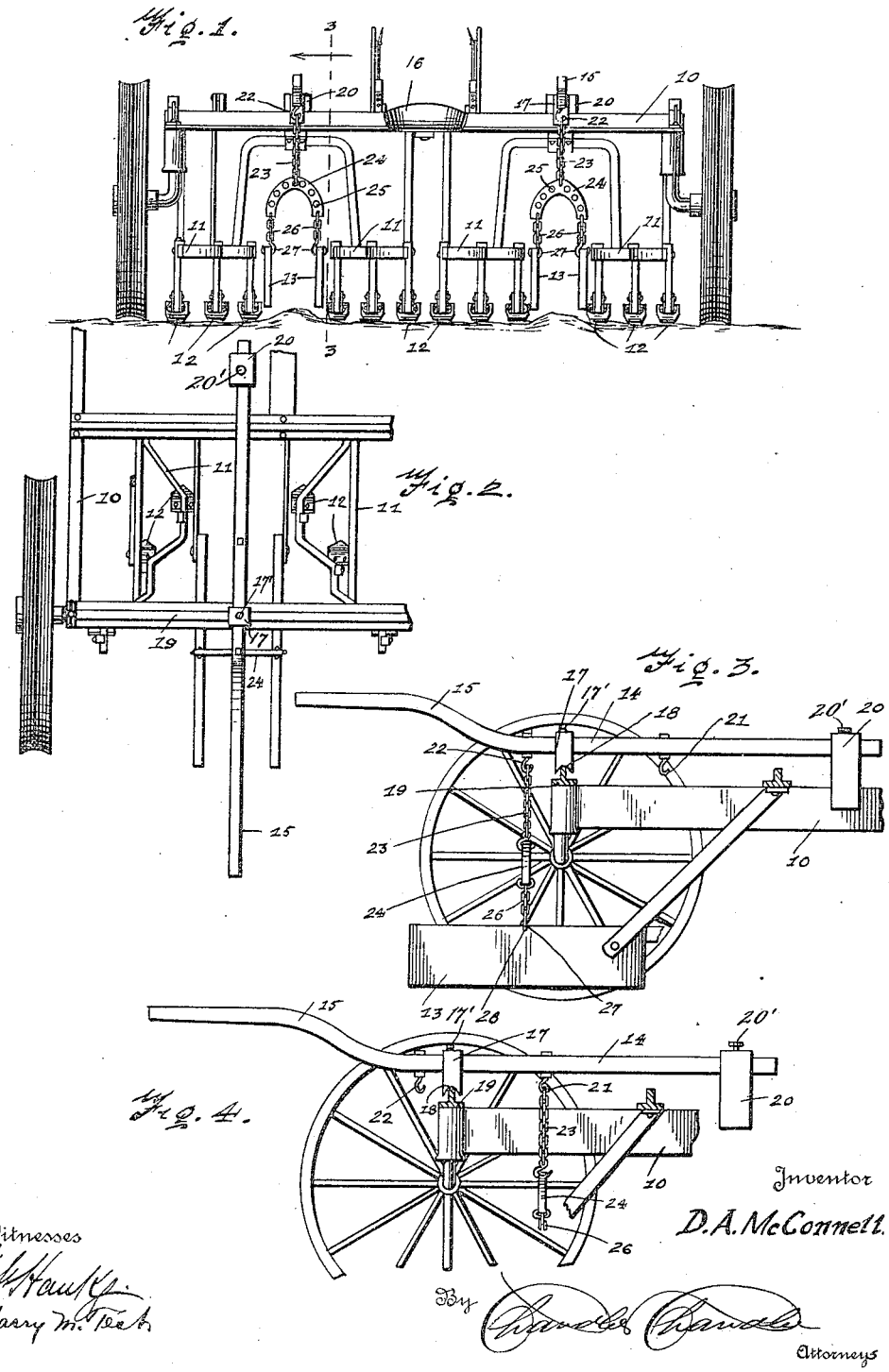

UNITED STATES PATENT OFFICE.

DANIEL A. McCONNELL, OF MALCOM, IOWA.

CULTIVATOR ATTACHMENT.

1,214,337.  Specification of Letters Patent.  Patented Jan. 30, 1917.

Application filed September 16, 1914. Serial No. 862,052.

*To all whom it may concern:*

Be it known that I, DANIEL A. McCONNELL, a citizen of the United States, residing at Malcom, in the county of Poweshiek, State of Iowa, have invented certain new and useful Improvements in Cultivator Attachments; and I do hereby declare the following to be a full, clear, and exact description of the invention, such as will enable others skilled in the art to which it appertains to make and use the same.

This invention relates to improvements in cultivator attachments, and particularly to attachments for raising and lowering the fenders.

One object of the invention is to provide a simple and novel device whereby the plant fenders of the cultivator can be readily and quickly raised and lowered while the cultivator is in motion.

Another object is to provide an attachment for a cultivator by means of which trash and weeds which are turned up by the shovels can be prevented from being turned onto the young plants, while at the same time sufficient loose soil is delivered around the stock of the plant.

Other objects and advantages will be apparent from the following description when taken in connection with the accompanying drawings.

In the drawings: Figure 1 is a rear elevation of a straddle row cultivator. Fig. 2 is a fragmentary top plan view. Fig. 3 is a sectional view on the line 3—3 of Fig. 1. Fig. 4 is a sectional view similar to Fig. 3, showing the fenders suspended from the forward hook 21.

Referring particularly to the accompanying drawing, 10 represents the frame of the cultivator, 11 the beams, and 12 the gangs of shovels. Disposed between the foremost pair of shovels are the fenders 13, these fenders being arranged to slide along the sides of the row of standing plants to protect the same from being covered up by the soil thrown by the shovels. Disposed longitudinally on the cultivator frame and in a line directly over the row of plants is a lever 14, the rear end of which is turned upwardly and rearwardly as at 15 to provide a handle which is disposed within convenient reach of the operator on the seat 16. A block 17 is adjustably secured to the member 14 by a set screw 14' and has a bifurcated lower end 18 which straddles the cross bar 19 of the frame 10. This forms a pivot for the lever so that the same can be rocked up and down. On the forward end of the lever is a slidably adjustable weighted block 20 secured by a set screw 20' and by means of which the lever can be restored to normal position after being operated. Forwardly and rearwardly of the block 17 are secured depending hook members 21 and 22 which are adapted to support a chain 23. On the lower end of the chain is secured the intermediate portion of a yoke 24, the arms of which are formed with series of openings 25 for attachment of the chains 26. The lower ends of the chains are provided with hooks 27 which are engaged through openings 28 in the fender boards 13.

From the foregoing it will be understood that when the chain 23 is engaged with the hook 22 that the fenders will be held normally in elevated position, and when it is desired to shield a plant which is smaller than the rest the lever 14 is depressed so that the fenders will be lowered, the soil turned by the shovels being directed against the fenders. Releasing the handle of the lever, the lever will swing upwardly into normal position by reason of the weight 20 pulling the fenders up with it.

When the chain 23 is attached to the hook 21 a depression of the handle 15 will raise the fenders. In this latter case, the fenders will be normally in lowered position.

The device is extremely simple in construction, and can be readily used with the ordinary straddle row cultivator without modifications to the cultivator.

What is claimed is:

An attachment for cultivators including a fulcrum block having an opening therethrough and having its lower end bifurcated to straddle one of the frame members of a cultivator, a lever extending through the opening, a set screw passing through the block into the opening to lock the lever in adjusted position, a hook carried by the lever to form yoke attaching means, and a weight slidably mounted on the lever and provided with means whereby it may be held in adjusted position on said lever.

In testimony whereof, I affix my signature, in the presence of two witnesses.

DAN. A. McCONNELL.

Witnesses:
J. A. BARNES,
O. M. LATTA.

Copies of this patent may be obtained for five cents each, by addressing the "Commissioner of Patents, Washington, D. C."